Sept. 9, 1952 N. C. PRICE 2,609,659
STARTING SYSTEM FOR INTERNAL-COMBUSTION TURBINE POWER PLANTS
Original Filed June 2, 1945 5 Sheets-Sheet 1
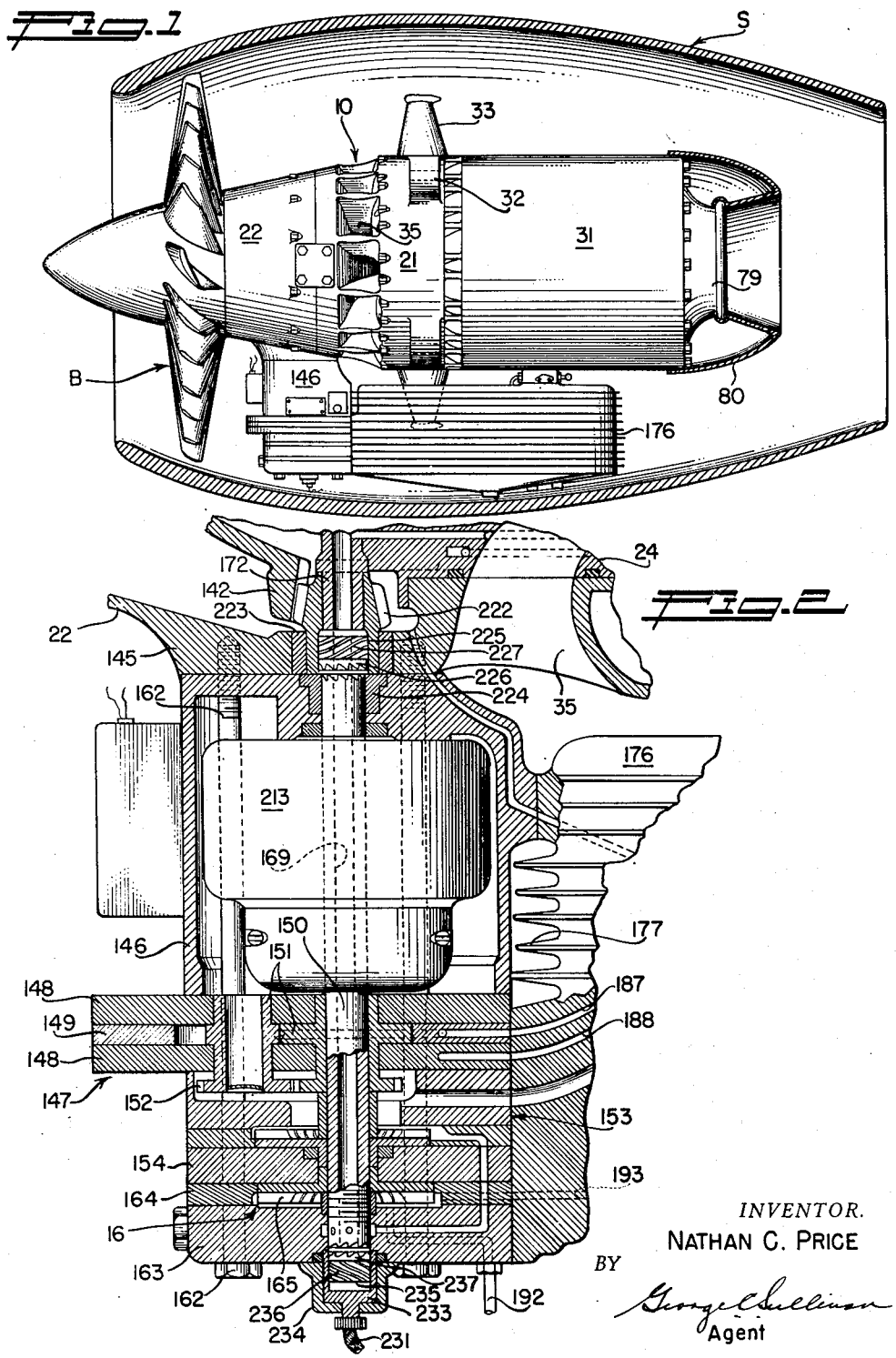
INVENTOR.
NATHAN C. PRICE
BY
George C. Sullivan
Agent

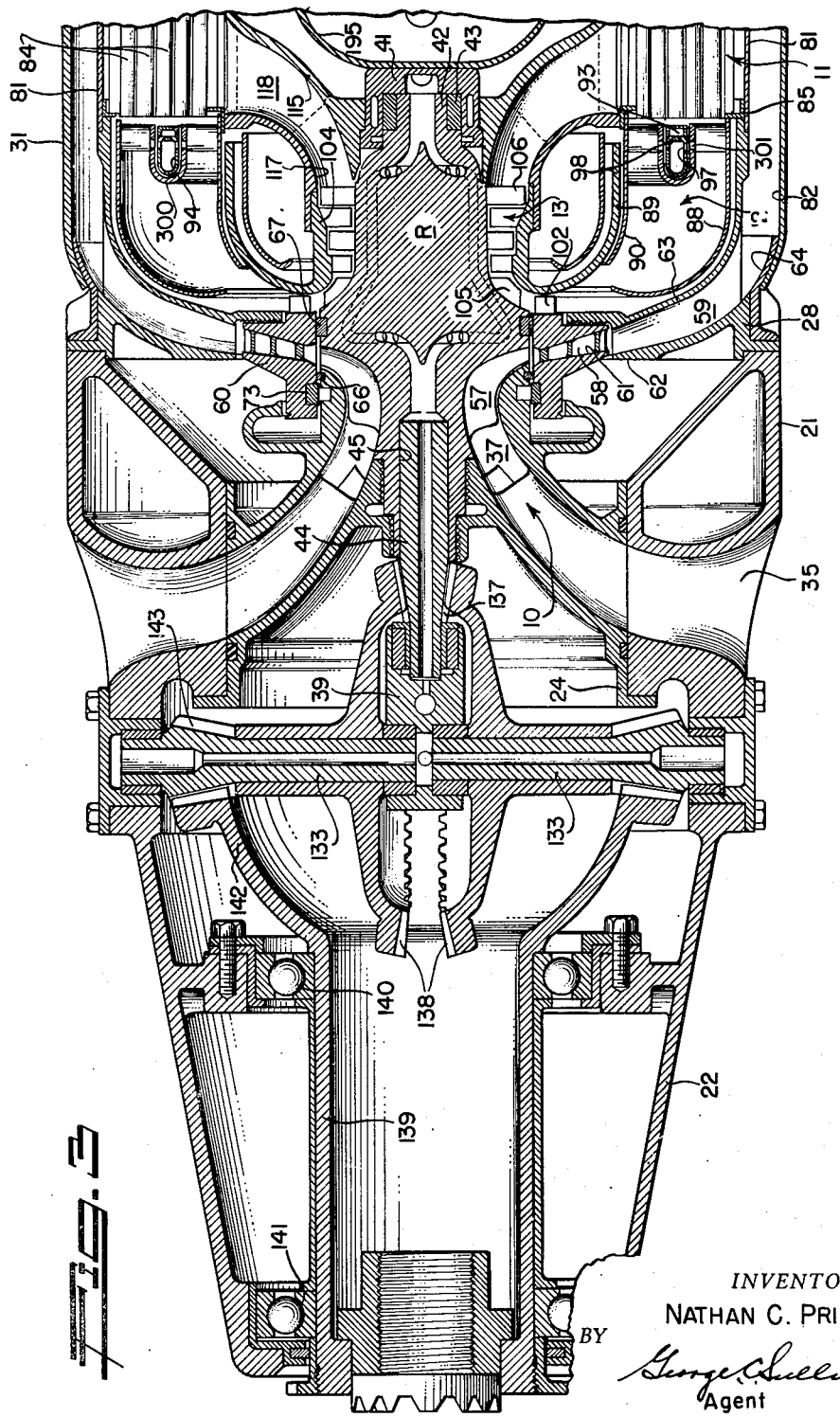

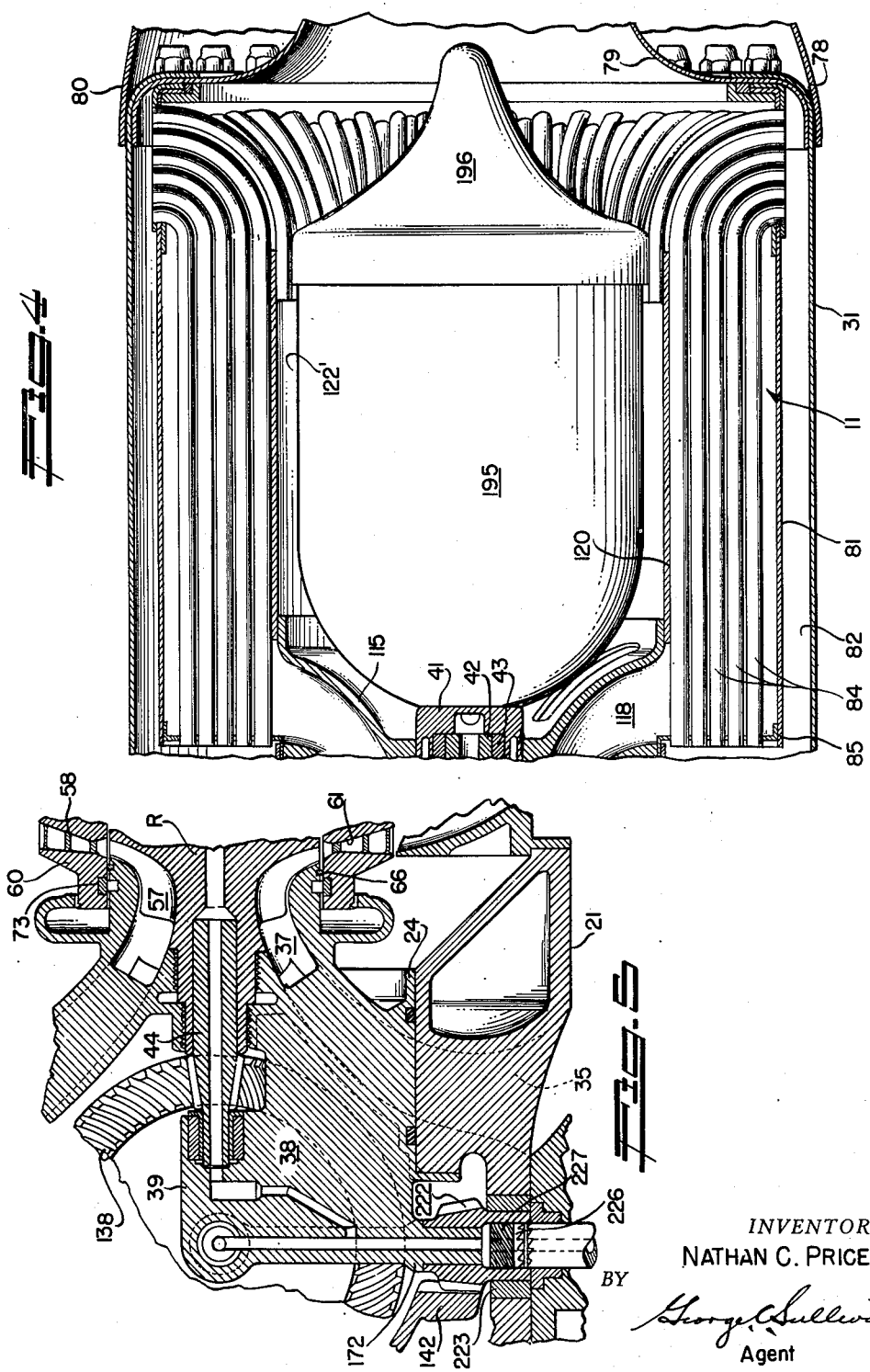

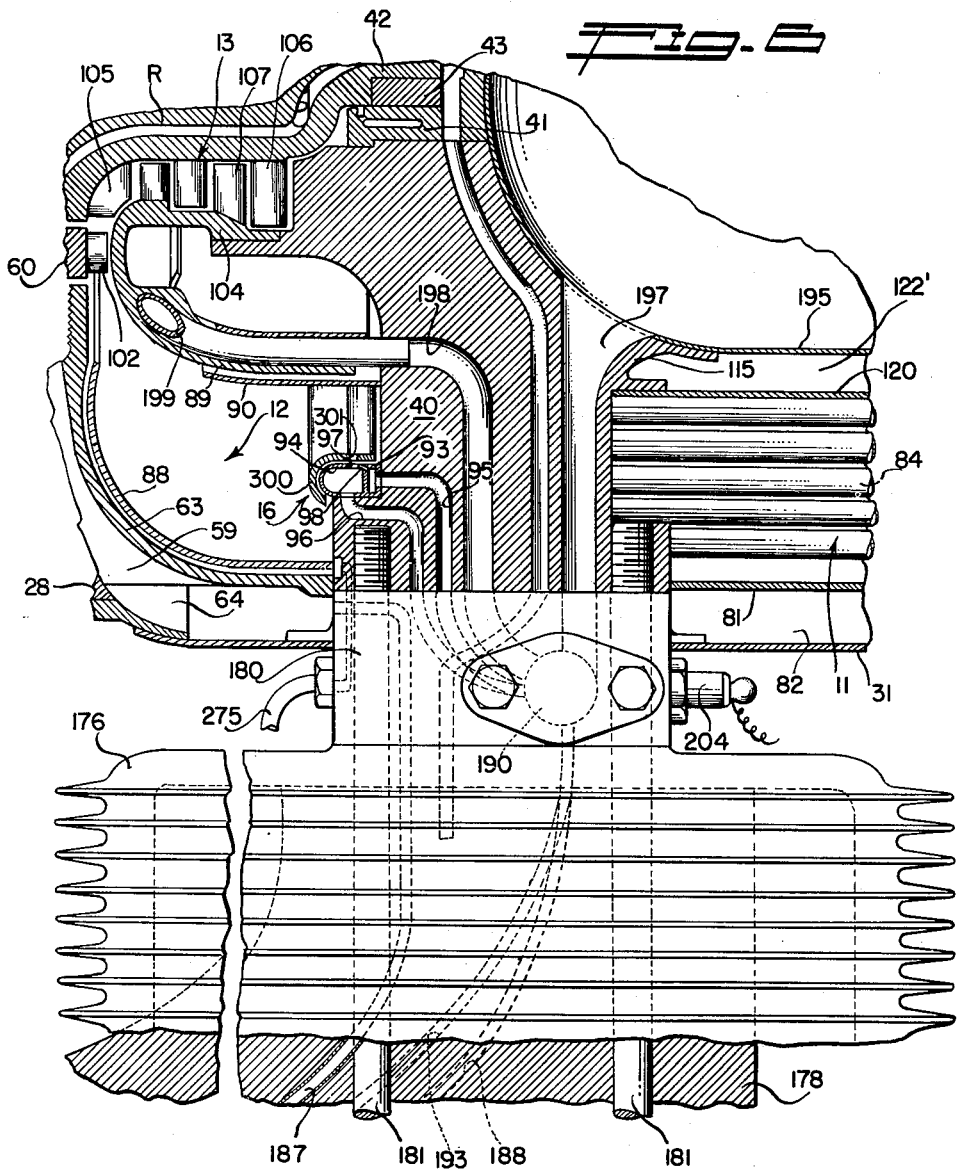

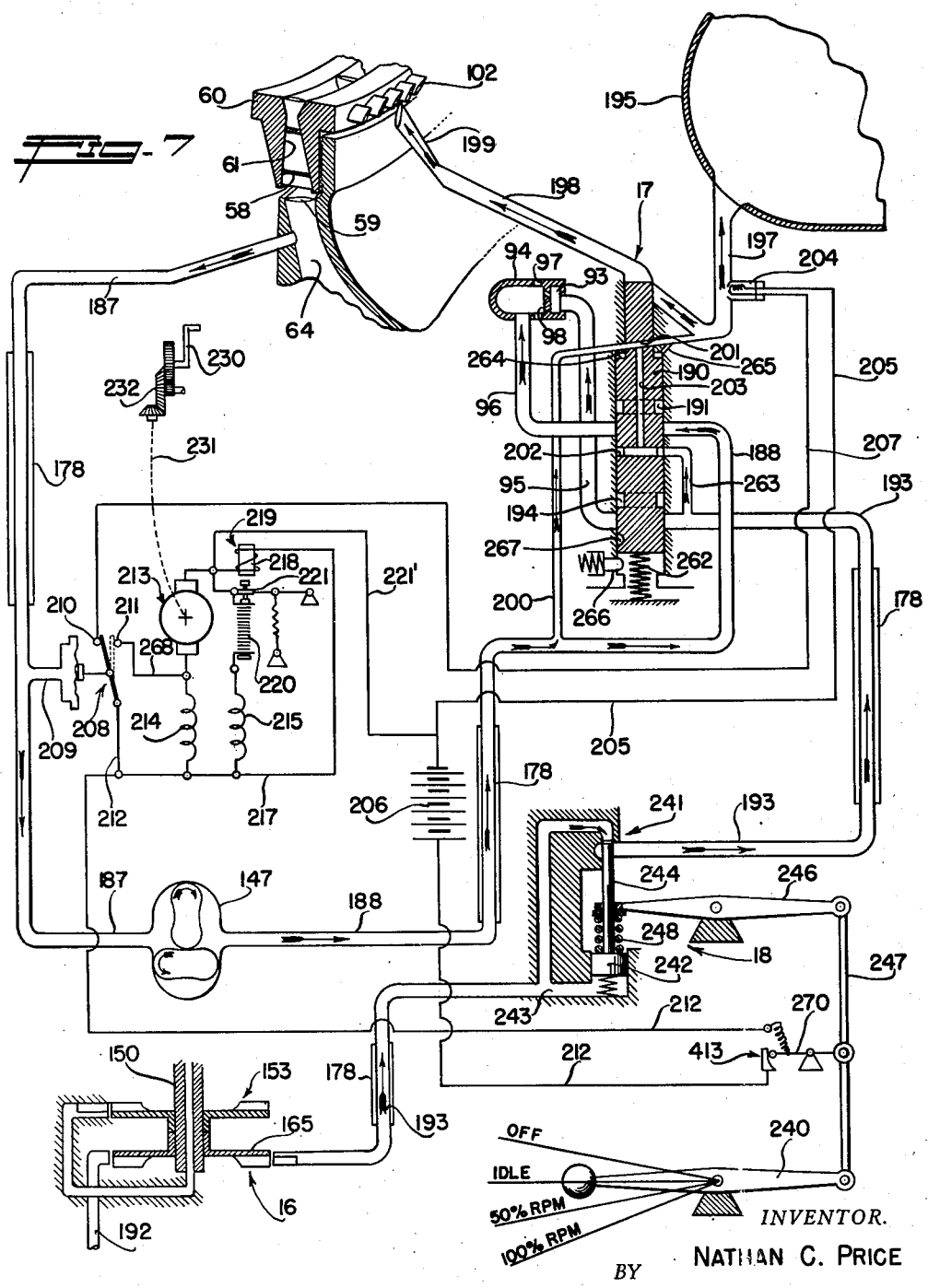

Patented Sept. 9, 1952

2,609,659

UNITED STATES PATENT OFFICE 2,609,659

STARTING SYSTEM FOR INTERNAL-COMBUSTION TURBINE POWER PLANTS

Nathan C. Price, St. Helena, Calif., assignor to Lockheed Aircraft Corporation, Burbank, Calif.

Original application June 2, 1945, Serial No. 597,308. Divided and this application March 24, 1948, Serial No. 16,856

16 Claims. (Cl. 60—39.14)

This invention relates to internal combustion gas turbines and relates more particularly to a starting means and associated controls for such powerplants. It is a general object of this invention to provide a reliable inexpensive starting system for incorporation in turbo power plants designed for a wide range of applications.

The present application is a division of my copending application serial No. 597,308 filed June 2, 1945.

The starting system of this invention is adapted primarily for embodiment in a self-contained gas turbine power plant having its own fuel pump system, electric generator, lubricant pump, etc. and it is another object of the invention to provide a starting system for this class of power plants that is coordinated with the various elements of the plant to obtain a rapid sure starting of the powerplant and the proper automatic control of the air and fuel injection and electric generating instrumentalities.

Another object of the invention is to provide a starting system which utilizes the air compressor and fuel pump of the fuel injecting system to supply air and fuel under pressure to an accumulator tank and which incorporates an automatic sequence control for governing the ignition and delivery of the air and fuel mixture from said tank to a starting nozzle which directs a stream of starting gases against the blading of an air compressing element of the power plant. The starting system embodies a motor generator which is energized by battery current to initially drive the air compressor of the fuel injecting system to supply compressed air to the accumulator tank of the starting system. The motor generator also serves as a motor to initially drive the lubricant pump and fuel pump to pre-lubricate the various elements of the power plant and to build up fuel pressure for operation of the plant. The sequence control of the starting system provides for the correctly related or timed operation of the starting valve, the diversion of the air and fuel pressure to the injector, and the energization of the fuel igniting glow plug to initiate operation of the power plant.

A further object of the invention is to provide a power plant structure of the character described in which the starter motor and auxiliary generator, the fuel and oil pumps, the air injecting blower and other accessories are incorporated in a compact assembly removably secured to the housing of the power plant for convenient installation, servicing and replacement.

Other objectives and advantages of the invention will become apparent from the following detailed description of a typical preferred embodiment wherein:

Figure 1 is a side elevation of a power plant embodying the present invention arranged in a tubular shroud showing the shroud in longitudinal cross section;

Figure 2 is an enlarged, vertical sectional view of the auxiliary assembly of the power plant;

Figure 3 is an enlarged, longitudinal detailed sectional view of the forward and major portion of the power plant;

Figure 4 is a longitudinal, sectional view of the rear portion of the power plant showing the accumulator tank in side elevation;

Figure 5 is an enlarged, fragmentary, sectional view of the forward portion of the power plant taken in a plane at right angles to the plane of sectioning of Figure 3;

Figure 6 is an enlarged, fragmentary, vertical, sectional view, illustrating the combustion chamber and the starting nozzle and showing a portion of the oil sump in side elevation; and Figure 7 is a diagrammatic view illustrating the various circuits of the power plant and starting system.

The internal combustion turbo power plant illustrated in the drawings and which incorporates the features of the invention comprises, generally, compressor means 10, a heat exchanger 11 receiving the compressed air from the compressor 10, a combustion chamber 12, turbine means 13, driving propeller blading B, a fuel supply system 16 and a starting means 17.

In Figure 1, the power plant is illustrated arranged in a tubular shroud or envelope S. The rear portion of the shroud S is rearwardly convergent for the discharge of the air stream from the blading B, and the air and gases of combustion generated by the powerplant, to obtain a reaction propulsive effect. However, the primary propulsive effect is obtained by the in-tube blading B. The housing assembly of the power plant includes a tubular intermediate section 21 having a tapered forward portion. A front section 22 is secured to the forward end of the section 21 and a separately formed cylindrical member 24 is secured within the intermediate section 21. A third tubular housing section 28 is secured to the rear end of the intermediate section 21 and an elongate tubular shell 31 extends rearwardly from the section 28 to enclose the heat exchanger 11. Spaced lugs 32 project from the intermediate section 21 and supporting arms 33 are secured to the lugs. The arms 33 are fixed to the shroud S to support the power plan concentrically within the shroud.

The compressor means 10 has a series of spaced air inlet passages 35 extending inwardly and rearwardly through the intermediate section 21 and member 24. The passages 35 diminish rearwardly in capacity to an annular chamber 37. The power plant includes a central rotor R and a counter-rotating ring 60 surrounding the rotor. The rotor R, which carries both compressor and turbine blading, is provided at its rear end with an axle 42 supported by a bearing 43 carried in a journal box 41 on a central web 40, see Figure 6. The web 40 projects upwardly from a member 115 at the rear of the housing section 28. A shaft 44 is secured in the forward opening 45 in the rotor R and is journaled in a boss 39 on an upwardly extending web 38 of the member 24, see Figure 5.

The abovementioned compression chamber 37, which is annular, extends rearwardly from the inlet passages 35 and then curves radially outward. The rotor R has an intermediate portion of increased external diameter and the forward face of this portion forms one wall of the outwardly extending part of the chamber 37. The chamber 37 decreases in capacity in the direction of air flow and compressor vanes 57 are provided on the rotor R for operation in the chamber. The counter-rotating ring 60 carries diffuser blades 58 in an annular passage 61 leading radially through the ring from the exit of the compressor chamber 37 to the periphery of the ring. A passage 61 is venturi shaped having a convergent entrance and a divergent or flaring exit. The aforementioned casing section 28 has spaced curved walls 62 and 63 defining an air discharge passage 64 for the compressor. The passage 64 curves radially and rearwardly from the passage 61 of the ring 60 and contains a series of spaced stationary diffuser vanes 59 pitched in the opposite direction to the rotating diffuser vanes 58. Seals 66 and 67 are provided between the rotor R and the counter-rotating ring 60 at opposite sides of the passage 61 and bearing means 73 is provided for the ring 60.

The air under pressure supplied by the compressor means 10 passes through the heat exchanger 11 before it is delivered to the combustion chamber 12. The abovementioned shell 31 forms the outer wall of the heat exchanger 11 and is provided at its rear end with an inturned lip 78 which engages with a tubular discharge fitting 79. The fitting 79 in turn cooperates with a shroud or faring 80 extending rearwardly from the shell 31. A tubular partition 81 of heat resistant metal is spaced within the shell 31 to leave an annular passage 82 which extends rearwardly from the compressor discharge passage 64. The heat exchanger 11 further includes an annular bundle or group of spaced tubes 84 arranged axially within the partition 81. The forward ends of the tubes 84 are secured in openings in a partition plate 85 arranged at the rear of the wall 63. The rear portions of the tubes 84 curve inwardly and are engaged in radial openings in the rear portion of the partition 81.

Air under pressure from the compressor 10 flows rearwardly from the annular passage 82 and enters the rear ends of the tubes 84 to flow forwardly through the tubes into the combustion chamber 12. During this circuit of the air through the heat exchanger 11 there is a substantial exchange of heat between the discharge gases and air flowing from the turbine and the compressed air so that the compressed air is preheated to increase the thermal efficiency of the power plant.

The combustion chamber 12 is an annular zone surrounding the turbine 13 at the rear of the counter-rotating ring 60. The wall 63 and a second tubular wall 89 spaced inwardly therefrom, constitutes the outer and inner walls respectively of the combustion chamber. The rear portion of the combustion chamber 12 is circular while the forward portion of the chamber is of diminishing capacity and curves radially inward to a restricted throat. Protective shrouds 88 and 90 are arranged in spaced adjacent relation to the walls 63 and 89 respectively, to leave cooling air spaces. A substantially annular shroud 300 is anchored to the web 40 and is arranged in the rear portion of the chamber 12 substantially mid-way between the shrouds 88 and 90. Hollow ring sections 93 and 94 are housed within the shroud 300 and ports 95 and 96 in the web 40 conduct fuel and air under pressure to the rings 93 and 94 respectively. The walls of the ring 94 have spaced air orifices 97 discharging through ports 301 in the shroud 300. The walls of the ring 93 have angular fuel orifices 98 joining the air orifices 97 in such a manner that the fuel and air mixture is discharged into the combustion chamber.

The counter-rotating ring 60 is driven by a row of reaction type turbine blades 102. The blades 102 project axially from the rear face of the ring 60 to project into the constricted exit throat of the combustion chamber 12. The gases of combustion and the heated air flow through the restricted exit of the combustion chamber at a high velocity and the buckets 102 absorb only a small proportion of the energy of the gases and air in driving the ring 60. The buckets 102 eliminate the necessity for providing a nozzle ring between the combustion chamber and the expansion zone of the turbine.

The turbine 13 includes a generally cylindrical portion 104 of the wall 89 arranged in spaced surrounding relation to the cylindrical rear portion of the rotor R to provide the expansion zone of the turbine. The forward end of the wall 104 is curved in substantially concentric relation to the curved rear face of the rotor enlargement to provide the curved direction changing entrance of the expansion zone. A row of Francis type blading 105 is provided on the rotor R to operate in the curved entrance and to be acted upon by the expanding gases entering the turbine. Spaced rows of impulse type buckets 106 are provided on the cylindrical portion of the rotor R and the wall 104 carries rows of stator blades 107 which stand between the rows of rotor blades 105 and 106. A turbine discharge member 115 is associated with the web 40 and has a collector chamber 117 at the rear end of the turbine expansion zone. Curved ducts 118 extend through the member 115 from the collector chamber 117 to the heat exchanger 11 to discharge the turbine exhaust gases into the heat exchanger for flow therethrough and to ultimately discharge from the fitting 79.

The powerplant includes a lubricating and cooling system for the bearings of the rotor, the speed reduction drive, etc. This lubricating system form the subject of my co-pending application Serial No. 12,821 filed March 3, 1948, and its details are not essential to a full understanding of the present invention. Accordingly, it will suffice to state that the lubricating system includes a lubricant pump 153 embodied in the auxiliary assembly to be more fully described below. The pump 153 supplies lubricant under pressure to a passage 169 in a radial shaft 150 to flow to the bearings of the transmission, the rotor, etc.

A detailed description of the particular form of transmission illustrated for transmitting power from the rotor R to the blading B is not necessary to a complete understanding of the present invention and this mechanism will not be described in detail. However, in order to understand the manner in which the abovementioned shaft 150 is operatively related to the rotor R to effect a starting of the power plant, it will be necessary to briefly describe the transmission. The transmission includes two aligned cross shafts 133 journaled in the housing sections 21 and 22. Gears 138 of substantial diameter are fixed on the shafts 133 and mesh with a pinion 137 formed on the rotor shaft 44. A tubular propeller shaft 139 is supported in bearings 140 and 141 carried in the casing section 22 and a gear 142 of substantial diameter is formed on the rear end of the shaft. The gear 142 meshes with pinions 143 on the cross shafts to provide the second stage of speed reduction. The shaft 139 is suitably coupled with the blading B to drive the same.

The fuel injecting system, the lubricating system, the fuel supply system 16, and the governor system for the power plant are incorporated in an assembly removably secured to the power plant casing. In Figure 2 I have shown a flat surface boss 145 on the lower side of the casing section 22 to form a mounting for this assembly. The motor generator case 146 is engaged against the boss 145 to extend downwardly from the power plant and contains a motor generator 213. The fuel supply system includes a blower 147 arranged at the lower side of the motor case 146. The blower 147 is of the Root's type and comprises a housing formed of two end plates 148 separated by an intermediate margin plate 149. The abovementioned shaft 150 is the shaft of the motor generator 213 and passes downwardly through the blower housing. A blower rotor 151 is fixed to the shaft 150 and the two lobed rotors 151 of the blower may be identical and are provided with the conventional meshing timing gears 152. The abovementioned pump 153 of the lubricating system is arranged below the blower 147. The pump of the fuel supply system is positioned below the lubricant pump 153 and includes a lower housing plate 163 and a scroll plate 164 arranged between the plate 163 and the lower plate 154 of the lubricant pump. The rotor 165 of the fuel pump is fixed to the shaft 150 to operate within the scroll plate 164. Cap screws 162 pass through openings in the motor generator case 146 and through aligned openings in the several plates of the blower 147, lubricant pump 153 and fuel pump. The upper ends of the screws 162 thread into openings in the boss 145 to secure the assembly to the power plant casing.

An oil sump 176 is arranged below the power plant at the rear of the auxiliary assembly just described. The pump 176 receives the hot lubricant and cooling medium leaving the power plant and contains a quantity of the liquid medium for re-circulation through the power plant. A block 180 bears upwardly against the abovementioned web 40 and the upper side of the sump 176 engages the block. An internal web 178 is provided in the sump and screws 181 pass through vertical openings in the sump 176, web 178 and block 180 and thread into openings in the web 40 to secure the sump to the power plant.

The fuel supply system 16 includes the blower 147 described above. It is preferred to bleed compressed air from the compressor means 10 of the power plant to the inlet side of the blower 147 so that a double stage of compression is obtained for the injection air supplied to the ring 94 of the fuel injecting manifold. A duct 187 extends from the outlet passage 64 or 82 of the compressor means 10 and passes through the web 178 of the sump to the inlet of the blower 147. The air passing through that portion of the duct 187, which is in the web 178, is in heat absorbing or heat transfer relation to the heated oil of the sump whereby the air is heated during its passage to the blower. A duct 188 returns back through the web 178 of the sump to the block 180 so that the compressed air is again heated before delivery to the manifold ring 94. A shuttle valve 190 is interposed between the duct 188 and the abovementioned passage 96, which finally conducts the air to the injection ring 94. The valve 190 as shown in Figure 7 is a cylindrical part slidably arranged in a horizontal opening in the block 180. An annular external groove 191 is provided in the valve 190 and in the open position of the valve, communicates with the two passages 188 and 96 to connect the same. It will be seen that during operation of the power plant the fuel injecting air is compressed by the compressor means 10, is preheated during its passage to the blower 147, is compressed by the blower 147, and is again heated before delivery to the manifold injecting ring 94.

A fuel supply line 192 leads from a suitable fuel supply, not shown, to the intake of the fuel pump, and a duct 193 extends from the high pressure side of the pump through the sump web 178 and the block 180 to the valve 190. The fuel absorbs heat during its passage through that portion of the duct 193 which extends through the web 178. The valve 190 is interposed between the duct 193 extending from the fuel pump and the above referred to passage 95 which conveys the fuel under pressure to the injecting ring 93. The valve 190 is provided with an external annular groove 194, which communicates with the duct 193 and the passage 95 to allow the free flow of the fuel to the injecting ring 93 when the valve is in its open position.

The starting means 17 is operable to pre-lubricate the various power plant bearings, raise the fuel pressure, and spout or jet a stream of combustion gases against the buckets 102 of the counter-rotating ring 60 to drive the ring and thus develop sufficient air pressure in the plant for starting. The sequence control, to be later described, provides for the diversion of fuel and air pressure to the injecting rings 93 and 94 for the starting and for continued power plant operation. The starting means includes a tank 195 positioned within the inner wall 120 of the heat exchanger 11; see Figure 4. The tank 195 may be attached to the web 40 and extends rearwardly therefrom in spaced relation to the wall 120 of the heat exchanger 11 to leave an annular cooling air passage 122'. The rear end of the tank may be provided with a faired or rearwardly convergent cap 196. A single passage 197 extends through the web 40 and block 180 from the interior of the tank 195 to the valve 190, as shown schematically in Figure 7. A second passage or duct 198 is provided to extend from the valve to a nozzle 199 formed and arranged to spout against the buckets 102 of the counter-rotating ring 60. The nozzle 199 is of the De Laval type, and projects forwardly from the wall 89. As illustrated in Figure 7, an end portion of the valve 190 controls communication between the passages 197 and 198. The valve 190 is biased by a spring 262 to the closed position illustrated in Figure 7 where it closes off communication between the passages 197 and 198.

The starting means 17 provides for the delivery of compressed air and fuel to the starting tank 195 and for the ignition of the fuel and air mixture therein to create a substantial volume of combustion gases under pressure which are discharged from the nozzle 199 to initiate turbine operation. A branch passage 200 in the web 40 extends from the air pressure passage 188 to the tank passage 197. This branch passage is controlled by the valve 190, the valve having a diametric port 201 which completes the passage 200 when the valve is in the position of Figure 7, the passage 200 being closed when the valve is in its normal open position. The fuel passage 193 has a branch 263 extending to the valve 190 where it communicates with an annular external groove 202 when the valve is in the position illustrated in Figure 7. An axial port 203 extends through the valve 190 from the groove 202 to the abovementioned diametric air pressure port 201. This arrangement provides for the delivery of the fuel to the air port 201, and the air passing through that port shears off the fuel stream to break up the fuel and assure the delivery of an effective fuel and air mixture to the starting tank 195.

The starting means 17 further includes an ignition system for igniting the fuel and air mixture in the tank 195. A glow plug or igniting plug 204 is arranged in the block 180 to have its resistance glow wire exposed in the starter tank passage 197. The plug 204 in this location is readily accessible and is not subjected to the high temperatures generated in the combustion chamber. A lead 205 extends from one terminal of the plug 204 to a storage battery 206, and a lead 207 extends from the other terminal of the plug to a pressure sensitive switch 208. The pressure operated switch 208 may be of the diaphragm or bellows type, and its pressure chamber has communication with the duct 187 leading from the discharge passage 64 of the compressor means 10. Figure 7 diagrammatically illustrates a branch line 209 extending from the duct 187 to the pressure operated switch to subject the same to the pressure in the passage 64 of the compressor means 10. The switch embodies a movable contactor controlled by the pressure sensitive bellows and two spaced stationary contacts 210 and 211 engaged by the contactor in its two positions. The lead 207 from the ignition plug 204 connects with the contact 210, and the contactor remains in engagement with this contact until a predetermined pressure is built up by the compressor means 10. A conductor 212 extends from the contactor of the pressure responsive switch 208 to a master switch 413, and thence to the battery 206. When the master switch 413 is closed, a circuit is completed to the ignition plug 204 through the leads 205 and 207, the pressure switch 208 and the lead 212. The ignition plug 204 is designed to ignite the rich fuel and air mixture in the tank 195 a predetermined time subsequent to closing of the master switch 213. For example, the plug 204 may be constructed to cause ignition of the mixture ten or twelve seconds after closing of the master switch.

Provision is made for automatically shifting the valve 190 from the position of Figure 7 to the open position upon igniting the fuel and air mixture in the starting tank 195. The valve 190 is stepped or graduated in diameter to have an axially facing annular piston surface or shoulder 264. The starter tank passage 197 or the end portion of the passage 197 communicating therewith, has a branch port 265 for delivering pressure to the piston shoulder 264 of the valve. The above described spring 262 initially holds the valve 190 in the position of Figure 7 where the passage 198 is closed. Upon igniting of the fuel and air mixture in the starting tank 195 and its passage 197, the resultant pressure is conveyed through the port 265 to act against the shoulder 264, and the pressure thus applied suddenly reverses the valve 190. When the valve 190 is thus reversed, the gases of combustion are free to flow through the passage 198 to the nozzle 199 and the passages 95 and 96 of the fuel injecting system are opened to receive the air and fuel under pressure for power plant operation. The shifting or reversal of the valve 190 also closes the starting fuel and air passages 263 and 200.

Releasable means is provided to hold the valve 190 in the open position where fuel and air under pressure are delivered to the injecting rings 93 and 94. This means may comprise a spring urged detent 266 for cooperating with a notch 267 in the valve 190. When the valve 190 is moved to the open position by the gas pressure acting upon its shoulder 264, the detent 266 snaps into the notch 267. The engagement of the detent 266 in the notch 267 assisted by the pressure in the combustion chamber 12 acting upon the reduced end of the valve 190 and conveyed thereto by the nozzle 199 and the passages 198 and 265, holds the valve in the open position. The combined effect of the detent 266 and the combustion chamber pressure acting on the valve 90 overcomes the spring 262. However, when the pressure in the combustion chamber falls to a given value at the termination of power plant operation, the spring 262 overcomes the detent 266 and restores the valve 190 to the position of Figure 7 and thus conditions the power plant for restarting. From this it will be seen that the shuttle valve 190 and the associated parts are governed by the pressures generated in the starting tank 195 and the combustion chamber 12 to provide for the power plant starting and stopping sequence.

The motor-generator 213 housed in the abovementioned case 146 serves to drive the blower 147, the lubricant pump 153 and the fuel pump, during the starting cycle, to pre-lubricate the several bearings of the power plant and to supply the mixture of fuel and air under pressure to the starting tank 195. The motor-generator, as diagrammatically illustrated in Figure 7 of the drawings, includes a series field coil 214 and a shunt field coil 215. A conductor 217 extends from the abovementioned lead 212 to terminals of the coils 214 and 215 and thence to the solenoid 218 of a voltage regulator 219 associated with the generator. A shunt or cut-out line 268 connects the series field coil 214 with the contact 211 of the pressure control switch 208 so that the coil is shorted out when idling speed of the power plant is approached or attained. The shunt field coil 215 has one terminal connected to a carbon pile 220 and a tap 221' connects the other end of the carbon pile and one side of the solenoid 218 with the battery lead 205, the other side of the solenoid being connected in the line 217. The carbon pile 220 is varied or controlled by a spring urged plunger 221, and the latter is adapted to be acted upon by the solenoid 218.

It will be seen that the motor-generator 213 is circuited to serve as a motor when the contactor of the pressure-sensitive switch 208 is in engagement with the contact 210 and is circuited to serve as a generator when the contactor of switch 208 is in engagement with the contact 211.

A releasable or overrunning drive is provided between the motor-generator 213 and the transmission of the power plant rotor R so that the motor-generator is driven by the power plant to operate as a generator during power plant operation. The overrunning drive includes a pinion 222 freely rotatable on the stationary trunnion 172 and meshing with the gear 142; see Figure 2. The pinion 222 is supported by the trunnion and a bearing 223 carried by the abovementioned boss 145 of the power plant case. The shaft 150 of the motor-generator has its upper end portions supported by a bearing 224 in the case 146, and a plug 225 is arranged in the lower end of the pinion 222 to oppose the end of the shaft. The opposing ends of the shaft 150 and plug 225 have cooperable clutch teeth 226. Spiral splines 227 are provided on the plug 225 and the interior of the pinion 222, and cooperate to feed the plug downwardly and thus engage the clutch teeth 226 when the pinion 222 is driven by the power plant to rotate with respect to the shaft 150 of the motor-generator. Thus when the power plant is in operation the motor-generator is driven to supply current to the battery circuit. When the motor-generator is operating as a motor, the clutch teeth force the plug 225 upwardly to disengage the teeth.

Provision is made for manual operation of the blower 147, oil pump 153 and fuel pump for the purpose of starting the power plant in the event the battery 206 is dead or weak. This means includes a conveniently located hand crank 230 for driving a flexible cable 231 through the medium of a gear train 232. The cable 231 extends to the lower end of the shaft 150 where it is provided with a socket member 233. As illustrated in Figure 2, the socket member is rotatably supported in a bearing cap 234 and is sealed about in the lower plate 163. A plug 235 is arranged in the socket member, and the member and plug have cooperating spiral splines 236 operable to produce axial movement of the plug. The opposing ends of the shaft 150 and plug 235 have overrunning clutch teeth 237. The teeth 237 and the spiral splines 236 are constructed and related so that during rotation of the shaft 150 by the power plant, or by the motor-generator 213, the teeth 237 are disengaged. However, when the member 233 is rotated by operation of the hand crank 230, the splines 236 feed the teeth of the plug 235 into engagement with the teeth of the shaft 150 so that the blower 147, the fuel pump and the lubricant pump 153 are manually operated, through the drive just described, to condition the power plant for starting. It is to be understood that the manual starting means just described is primarily an emergency device to be employed when the battery is dead.

The speed governing means 18 of the invention provides for substantially constant operating speed of the power plant at any one of a plurality of selected manual settings of a manual throttle or control lever 240. The discharge pressure characteristic of the lubricant pump or the fuel pump is utilized as the control factor of the speed governing means. In the preferred arrangement illustrated, the discharge pressure characteristic of the fuel pump is employed as the speed governing factor. The fuel pump when employed in this manner, has a centrifugal impeller 165 provided with vanes which lean forwardly relative to its direction of rotation. A speed governing valve or throttle valve 241 is interposed in the discharge passage 193 leading from the fuel pump. This valve is a discharge pressure operated, manually settable valve, including a piston 242 operating in a cylinder having a branch port 243 which carries the discharge pressure of the fuel pump to act upon the piston. A needle or stem 244 on the piston 242 cooperates with a seat or angular portion of the fuel passage 193 to control the flow of fuel to the injecting means. A lever 246 is operated by the abovementioned throttle lever 240 through the medium of a suitable linkage 247 and a compression spring 248 is arranged betwen an arm of the lever 246 and the rear side of the piston 242. When a fuel pump of the character above described is employed it has a slightly rising pressure characteristic with an increase in flow, but the pump curve is substantially flat. The fuel pump discharge pressure varies substantially in accordance with the square of the turbine speed, regardless of the fuel flow rate change accompanying altitude variations. Therefore, when the throttle lever 240 is set to a given position, at 50% of full speed for example, the spring pressure against the discharge pressure operated piston is adjusted to obtain a substantially constant speed which is practically unaffected by altitude variations, propeller loading and other external conditions. However, the speed will increase slightly with an increase in altitude of the aircraft. The output of the fuel pump and the air pressure conditions in the combustion chamber of the power plant are related so that the fuel flow does not exceed a value where the substantially flat curve characteristics of the pump no longer prevail. As illustrated in Figure 7 of the drawings, the throttle lever 240 may have several predetermined and calibrated settings such as "off," "idle," "50% R. P. M." and "100% R. P. M." When the throttle lever 240 is in the "off" position, the stem 244 completely closes the fuel duct 193, and when the lever is in the "start" or "idle" position, the valve is cracked or only slightly opened to allow the delivery of fuel sufficient for starting and idling of the power plant.

The abovementioned master switch 413 is preferably associated with the manual throttle so that only a single manual operating member is required to start, stop and control the power plant. In Figure 7 I have shown a lever 270 connected to the linkage 247 for operating the master switch 413. The arrangement is such that the switch 413 is open when the lever 240 is in the "off" position, and closed when the lever is in the other positions.

A drain 275 communicates with the combustion chamber 11 and extends to the atmosphere to carry away excessive fuel in the event the combustion chamber 11 becomes flooded during starting of the power plant.

*Operation*

To start the power plant, the control or throttle lever 240 is moved to the "start" or "idle" position. This closes the master switch 413 to energize the motor generator 213 and to supply current to the igniting plug 204. The motor generator energized by the battery 206 drives the blower 147 to supply air under pressure to the starting tank 195, drives the fuel pump to raise the fuel pressure and supply fuel to the starter tank 195, and drives the lubricant pump 153 to raise the lubricant pressure and pre-lubricate the various power plant bearings. At this time the valve 190 is in the position of Figure 7, and the air pressure flows through the branch duct 200 and the port 201 to the starting tank and fuel is supplied through the branch passage 263 and the valve port 203 to the starter tank. At the end of a predetermined limited period established by the design or setting of the glow plug 204, the plug ignites the rich fuel and air mixture in the starter tank 195. Ignition of the fuel and air mixture results in the generation of sufficient pressure in the tank and the passages 197 and 265 to drive the valve 190 to its open position against the action of the spring 262. The starter valve 190 is subsequently retained in the open position by the detent 266 and by the combustion chamber pressures acting on its exposed end as above described. Opening of the starter valve 190 allows the combustion gases under pressure to flow from the starter tank 195 through the passage 198 to spout from the nozzle 199. The gases thus discharged by the nozzle 199 impinge against the buckets 102 of the counter-rotating ring 60 to spin the ring.

Opening of the starter valve 190 also diverts the air pressure from the blower 147 to the injection ring 94 and diverts the fuel under pressure from the fuel pump to the ring 93. The fuel and air mixture thus introduced into the combustion chamber 12 ignites in the chamber. The plant accelerates to idling speed by reason of the combustion gases from the chamber 12 driving the turbine 13, which, in turn, drives the compressor means 10. Operation of the compressor means 10 increases the air pressure at the discharge passage 64 of the compressor. When the pressure in the passage 64 reaches a given value, the contactor of the pressure sensitive switch 208 moves from the contact 210 to the contact 211 to de-energize the glow plug 204 and to disconnect the motor-generator 213 from the battery 206. When the pinion 225 is driven by the power plant relative to the motor-generator shaft 150, the overrunning clutch teeth 226 engage so that the motor-generator is driven by the power plant to supply current to the battery circuit under the control of the voltage regulator 219. When the throttle or control lever 240 is moved to a position to put the power plant on a power producing basis, the motor-generator becomes an effective electrical generator.

It is to be particularly noted that the starting sequence is automatic, and for normal starting it is only necessary to move the lever 240 to the starting position. In the event the power plant fails to start, the lever 240 may be restored to the "off" position and then again moved to the starting position where the above described operations are repeated.

Having described only a typical form of the invention, I do not wish to be limited to the specific details herein set forth, but wish to reserve to myself any variations or modifications that may appear to those skilled in the art and fall within the scope of the following claims.

I claim:

1. In an internal combustion gas turbine, an expansion zone, a combustion chamber for supplying gases of combustion to the expansion zone, a compressor casing, a rotor, turbine blading on the rotor operating in the expansion zone, compressor blading on the rotor operating in said casing, a counter-rotating ring having diffuser blading in surrounding relation to said compressor blading, means for conducting the compressed air from the diffuser blading to the combustion chamber, buckets on the ring positioned to be acted upon by the gases of combustion entering the expansion zone to rotate the ring, and starting means including a nozzle for spouting fluid under pressure against said buckets.

2. In an internal combustion gas turbine, an expansion zone, a combustion chamber for supplying gases of combustion to the expansion zone, a compressor casing, a rotor, turbine blading on the rotor operating in the expansion zone, compressor blading on the rotor operating in said casing, a counter-rotating ring having diffuser blading in surrounding relation to said compressor blading, means for conducting the compressed air from the diffuser blading to the combustion chamber, buckets on the ring positioned to be acted upon by the gases of combustion entering the expansion zone to rotate the ring, and means for starting the turbine plant including a container for an explosive mixture, means for igniting said mixture, and nozzle means for jetting the resultant combustion gases against the buckets of the ring to rotate the ring.

3. In an internal combustion gas turbine power plant, turbine means having a rotor and series of blading, a combustion chamber discharging gases of combustion under pressure into the turbine means, means for injecting fuel and air under pressure into the combustion chamber for power plant operation including a fuel pump and an air pump, and means for starting the power plant comprising a container, means for operating said pumps to supply a mixture of fuel and air under pressure to said container, means for igniting said mixture, and nozzle means for jetting the gases of combustion, resulting from the igniting of said mixture, against certain of said blading.

4. In an internal combustion gas turbine power plant, turbine means having a rotor and series of blading, a combustion chamber discharging gases of combustion under pressure into the turbine means, means for injecting fuel and air under pressure into the combustion chamber for power plant operation including a fuel pump and an air pump, and means for starting the power plant comprising a container, means for operating said pumps to supply a mixture of fuel and air under pressure to said container, there being a passage leading from said container, a glow plug in said passage for igniting said mixture in the container, and nozzle means for jetting the gases of combustion, resulting from the igniting of said mixture, against certain of said blading.

5. In an internal combustion gas turbine power plant, turbine means having a rotor and series of blading, a combustion chamber discharging gases of combustion under pressure into the turbine means, fuel injecting means in the combustion chamber, fuel and air pumps for supplying fuel and air under pressure to the injecting means, a drive between the rotor and pumps operative only during power plant operation, and means for starting the power plant comprising a container, ducts leading from said pumps to the container, means for operating the pumps to supply fuel and air under pressure to the container through said ducts, means for igniting said mixture in the tank, and nozzle means for discharging the gases, resulting from the igniting of the fuel and air mixture in said container, against certain of said blading.

6. In an internal combustion gas turbine power plant, turbine means having a rotor and series of blading, a combustion chamber discharging gases of combustion under pressure into the turbine means, fuel injecting means in the combustion chamber, fuel and air pumps for supplying fuel and air under pressure to the injecting means, a drive between the rotor and pumps operative only during power plant operation, and means for starting the power plant comprising a container, ducts leading from said pumps to the container, means for operating the pumps to supply fuel and air under pressure to the container through said ducts, means for igniting said mixture in the container, and nozzle means for discharging the gases, resulting from the igniting of the fuel and air mixture in said container, against certain of said blading, and valve means for diverting the fuel and air under pressure from said ducts to said injecting means subsequent to the igniting of said mixture.

7. In an internal combustion gas turbine power plant, turbine means having a rotor and series of blading, a combustion chamber discharging gases of combustion under pressure into the turbine means, fuel injecting means in the combustion chamber, fuel and air pumps for supplying fuel and air under pressure to the injecting means, a drive between the rotor and pumps operative only during power plant operation, and means for starting the power plant comprising a container, ducts leading from said pumps to the container, manually operable means for operating the pumps to supply fuel and air under pressure to the container through said ducts, means for igniting said mixture in the tank, and nozzle means for discharging the gases, resulting from the igniting of the fuel and air mixture in said container, against certain of said blading.

8. In an internal combustion gas turbine power plant, turbine means having a rotor and series of blading, a combustion chamber discharging gases of combustion under pressure into the turbine means, fuel injecting means in the combustion chamber, fuel and air pumps for supplying fuel and air under pressure to the injecting means, a drive between the rotor and pumps operative only during power plant operation, and means for starting the power plant comprising a container, ducts leading from said pumps to the container, a motor-generator for operating the pumps to supply fuel and air under pressure to the container through said ducts, means for igniting said mixture in the tank, and nozzle means for discharging the gases, resulting from the igniting of the fuel and air mixture in said container, against certain of said blading.

9. In an internal combustion gas turbine power plant, turbine means having a rotor and series of blading, a combustion chamber discharging gases of combustion under pressure into the turbine means, fuel injecting means in the combustion chamber, a fuel pump for pumping fuel under pressure to said injecting means, a motor-generator associated with the pump and operable as a motor to drive the pump to prime the plant for starting, an overrunning drive between the rotor and the motor-generator for driving the latter as a generator during power plant operation, and means responsive to the pressure developed by said compressor means for circuiting the motor-generator as a generator.

10. In an internal combustion gas turbine power plant, turbine means having a rotor and series of blading, a combustion chamber discharging gases of combustion under pressure into the turbine means, fuel injecting means in the combustion chamber, a fuel pump for pumping fuel to the injecting means, means operable by the igniting of a fuel charge for starting the power plant, a motor-generator connected with the pump and operable as a motor to drive the pump for the pumping of said charge to the starting means, a battery circuit for energizing the motor-generator to drive the pump, means for circuiting the motor-generator as a generator for the battery circuit when the power plant goes into operation, and a drive between the rotor and the motor-generator operative during operation of the power plant.

11. In an internal combustion gas turbine power plant, turbine means having a rotor and series of blading, a combustion chamber discharging gases of combustion under pressure into the turbine means, compressor means for supplying air under pressure to the combustion chamber, fuel injecting means in the combustion chamber, a fuel pump for pumping fuel to the injecting means, means operable by the igniting of a fuel charge for starting the power plant, a motor-generator connected with the pump and operable as a motor to drive the pump, a valve initially diverting the fuel from the pump to the starting means and operable upon the igniting of said charge to direct the fuel from the pump to the injecting means, a battery circuit for energizing the motor-generator to drive the pump for the purpose of supplying said charge to the starting means, means responsive to the pressure generated by the compressor means for circuiting the motor-generator as a generator for the battery circuit, and an overrunning clutch drive between the rotor and motor-generator for driving the latter when the power plant goes into operation.

12. In an internal combustion turbine power plant, turbine means, compressor means, a combustion chamber, an annular heat exchanger receiving the discharge gases from the turbine and conducting compressed air from the compressor means to the combustion chamber, the annular heat exchanger defining an internal space, and means for starting the power plant including a tank within the space defined by the annular heat exchanger and means for supplying an explosive starting mixture to the tank.

13. In an internal combustion tubrine power plant, turbine means having blading, a normally operating combustion chamber for supplying combustion gases to the turbine means, a starting combustion chamber for supplying combustion gases under pressure to the blading to start the plant, and selective means for supplying fuel to said chambers, including means for conducting fuel to said chambers, and a transfer valve for controlling the last named means and responsive to pressures in said chambers.

14. In an internal combustion turbine power plant, turbine means having blading, a normally operating combustion chamber for supplying combustion gases to the turbine means, a starting combustion chamber for supplying combustion gases under pressure to the blading to start the plant, and selective means for supplying fuel to said chamber, including separate means for conducting fuel to said chambers, and a transfer valve for controlling the last named means and responsive to pressures in said chambers.

15. In an internal combustion turbine power plant, turbine means having blading, a normally operating combustion chamber for supplying combustion gases to the turbine means, a starting combustion chamber for supplying combustion gases under pressure to the blading to start the plant, and selective means for supplying fuel to said chambers including separate means for conducting fuel to said chambers, a valve for controlling the last named means, means responsive to pressure in the starting chamber for operating the valve from the position where fuel is conducted to the starting chamber to the position where fuel is conducted to the normally operating chamber.

16. In an internal combustion turbine power plane, turbine means, compressor means operated by the turbine means, a combustion chamber interposed between the compressor means and the turbine means, and means for starting the power plant comprising a starting combustion chamber for supplying combustion gases under pressure to the turbine means, a glow plug in the last named chamber, and means responsive to pressures developed by the compressor means for controlling the glow plug.

NATHAN C. PRICE.

REFERENCES CITED

The following references are of record in the file of this patent:

UNITED STATES PATENTS

| Number | Name | Date |
|---|---|---|
| 1,388,707 | Heinze | Aug. 23, 1921 |
| 2,112,672 | Lasley | Mar. 29, 1938 |
| 2,257,982 | Seippel | Oct. 7, 1941 |
| 2,262,195 | Noack | Nov. 11, 1941 |
| 2,411,552 | New | Nov. 26, 1946 |
| 2,452,298 | Goode | Oct. 26, 1948 |
| 2,454,310 | Ganahl | Nov. 23, 1948 |